June 17, 1952   J. C. BENDER   2,600,959
HITCH
Filed June 22, 1950   2 SHEETS—SHEET 1

John C. Bender
INVENTOR

BY C. A. Snow & Co.
ATTORNEYS.

June 17, 1952     J. C. BENDER     2,600,959
HITCH
Filed June 22, 1950     2 SHEETS—SHEET 2
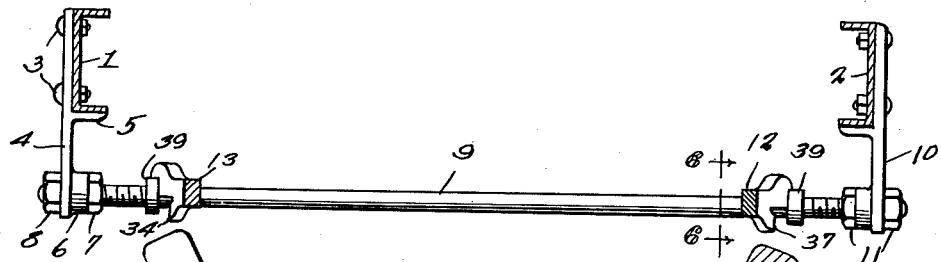
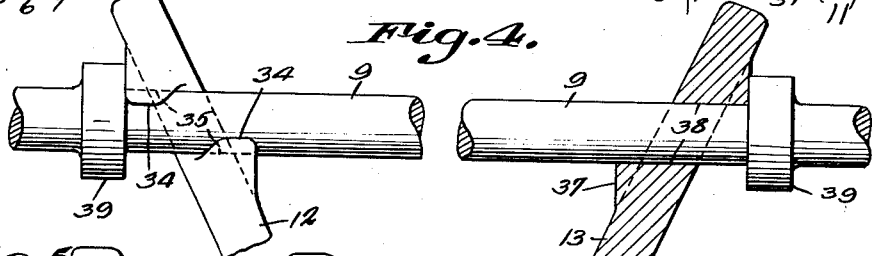
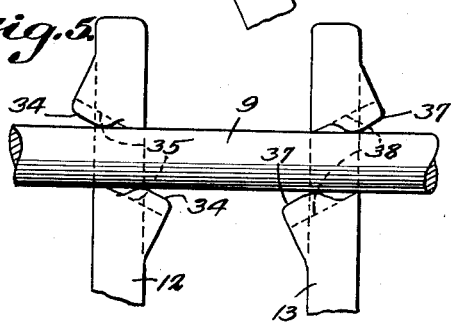
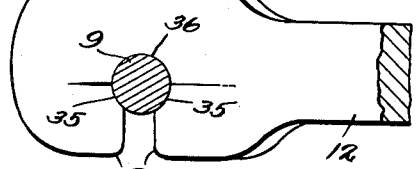
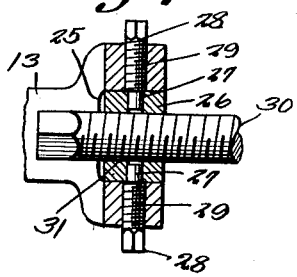
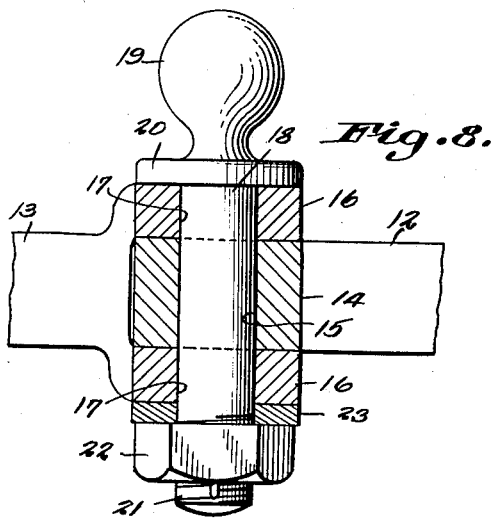
John C. Bender
INVENTOR
BY C. A. Snow & Co.
ATTORNEYS.

Patented June 17, 1952

2,600,959

UNITED STATES PATENT OFFICE 2,600,959

HITCH

John C. Bender, Hartville, Ohio

Application June 22, 1950, Serial No. 169,722

3 Claims. (Cl. 280—33.44)

This invention relates to a hitch adapted for use at any of various locations, as for example, as a hitch between an automobile and trailer; tractor and farm implement; and at other locations where it may prove desirable to detachably engage a towing vehicle and a towed structure.

By way of background, conventionally an automobile and a trailer to be towed thereby (taking these as typical examples of towed and towing vehicles) are generally hitched by means of a ball member mounted upon the bumper of the automobile, received in a socket carried by the front portion of the towed vehicle, said front portion of the towed vehicle being generally supported upon a dolly.

This present hitch arrangement has certain disadvantages, and one of these resides in the inconvenience and loss of time resulting from the frequent hitching or unhitching of the towed and towing vehicles. Hitches as conventionally constructed do not permit the making of the necessary connections with desired speed and facility, and additionally, present an unsightly appearance upon the rear of a towing vehicle.

It is an important object of the present invention, accordingly, to provide a hitch that will permit connection or disconnection of the towing and towed vehicles with complete speed and ease; will be of considerable strength; will be capable of mounting upon the frame members below the towing vehicle, so as to give no evidences of the presence of the hitch when the vehicles are disconnected; and will be relatively low in cost while yet being durable and composed of a minimum of parts simply arranged.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Fig. 3 is a section taken substantially on line 3—3 of Fig. 1.

Fig. 4 is an enlarged fragmentary bottom plan view of the jaw portions of the hitch, one of said jaw portions being shown in section.

Fig. 5 is a bottom plan view of the spreadable arms of the hitch and jaws formed thereon, in the contracted positions of said arms.

Fig. 6 is an enlarged section taken substantially on line 6—6 of Fig. 3.

Fig. 7 is an enlarged vertical section through one end of an arm contracting and spreading means embodied in the invention.

Fig. 8 is a greatly enlarged section taken substantially on line 8—8 of Fig. 2.

Figure 1:
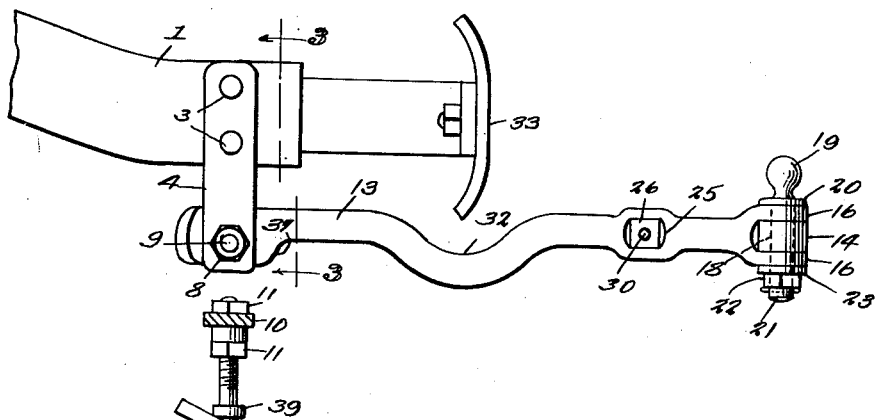
Fig. 1 is a side elevational view of the hitch as applied to the rear portion of an automobile frame.

Referring to the drawings in detail, in the present instance I have illustrated the invention as applied to an automobile frame. However, it should be understood that within the scope of the appended claims, the hitch can be used on other vehicles with equal facility, as for example, tractors, trucks, or the like.

In any event, in the present instance I have illustrated a conventionally formed vehicle frame having the side channels 1 and 2 disposed below the body of the automobile, not shown.

Fixedly secured by means of bolts 3 or their equivalents to the channel 1, is the depending bracket 4 extending downwardly below the channel a short distance and preferably formed with the inwardly extended ledge portion 5 engaging below said channel. At its lower end the bracket 4 is formed with a boss 6 formed with an opening, nuts 7 and 8 being threaded against opposite sides of the lower end of the bracket, upon one end of a cross bar 9 that extends through said boss, the cross bar 9 having a threaded end for threaded engagement with said nuts.

To the channel 2 is fixedly connected a similar bracket 10, secured to the opposite end of the cross bar 9 by nuts 11.

The depending brackets and cross bar, when secured to the frame of the automobile, are inconspicuously placed and in many instances, invisible. In any event, they are left upon the vehicle indefinitely, to provide a means engaging jaws on the outer ends of spreadable arms 12 and 13 respectively. The arms 12 and 13 are pivotally connected at their inner ends, and the pivotal connection may be as shown in Fig. 8, wherein it is seen that the arm 12 is formed at its inner end with a ring 14 having the vertical opening 15, while the arm 13 is formed with yoke arms embracing the ring 14 and each having a vertical opening 17 adapted to register with the opening 15. Thus, a pin 18 can be extended downwardly through the registering openings 15, 17, the pin 18 being formed integrally at its upper end with a ball 19 corresponding to the ball generally mounted upon the bumper of an automobile. Immediately below the ball 19 the pin is formed with an annular collar 20 overlying the upper yoke arms 16.

The lower end 21 of the pin 18 is threaded and projects downwardly below the arms 12 and 13 any desired distance, this threaded end 21 receiving a nut 22 that secures the connection, washer 23 preferably being interposed between said nut and the lower yoke arm.

In this connection, it should be noted that although I have here illustrated the arms 12 and 13 as being pivotally connected at their rearmost or inner ends, I believe it is possible that the pivotal connection could be located at a distance from the rear ends of the arms, so that the arms in effect cross at the pivotal connection and have projecting spreadable portions disposed rearly of said connection. These spreadable portions, I believe, could effectively be secured to a trailer dolly or the like if desired.

However, in the present instance it is desirable in any event to provide means for spreading or contracting the arms and for retaining them in fixed relationship in any position to which they are spreadably adjusted. To this end, there is provided in the present instance a spreading and locking means disposed adjacent the pivotal connection of the arms and fully exposed for ready accessibility to one designed to operate said means.

Considering the details of said locking means, the arms 12 and 13 respectively are formed adjacent their inner ends with large openings 25 in which are mounted blocks 26, the blocks 26 being pivoted in their respective openings. The pivotal mounting of the blocks is illustrated in Fig. 7, wherein it is seen that the blocks have vertically disposed openings into which extend studs 27 formed upon threaded pins 28 that thread in openings 29 formed in the respective arms. The outer ends of the pins 28 can project beyond the arms a short distance and are provided in the present instance with non-circular end portions to receive a small wrench or similar tool whenever it is desired to adjust the pins 28 in their openings.

Figure 2:
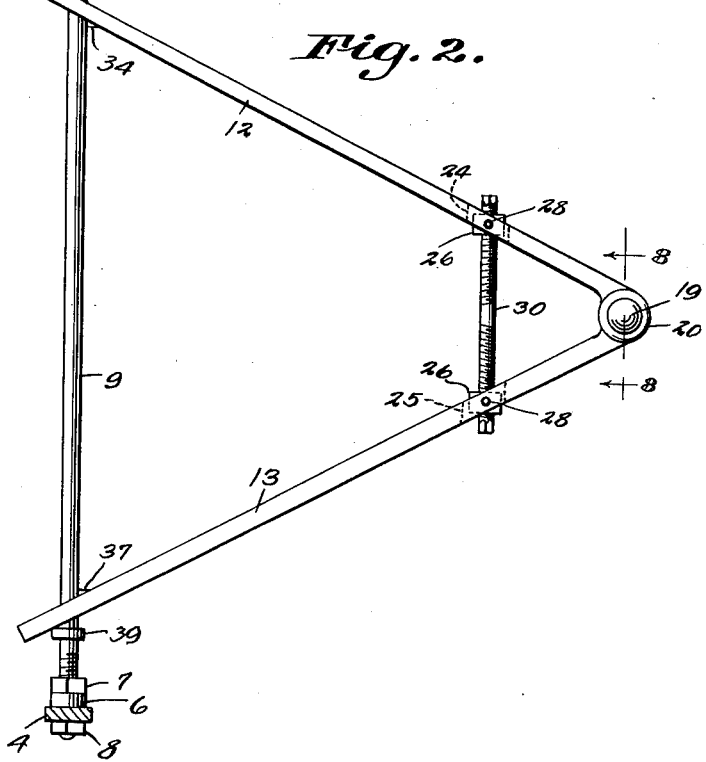
Fig. 2 is a top plan view.

To effect controlled spreading or contraction of the arms 12 and 13 I provide a right and left hand threaded screw 30 having wrench-receiving ends projecting beyond the respective arms (see Fig. 2), the oppositely threaded respective end portions of said screw being threaded in threaded openings 31 of the blocks or pivoted nuts 26.

As seen from Fig. 1, each arm is formed intermediate its ends with a depressed portion 32 to permit clearance of the bumper 33 of the automobile.

The free ends of the respective arms 12 and 13 are adapted to grip the cross bar 9, and the formation of the bar-gripping jaws on the free ends of said arms is of importance. The arm 12, to this end, is formed with opposed jaws 34 each extending obliquely relative to the longitudinal center line of said arm 12, so as to extend obliquely from opposite sides of said arm, as best seen from Figs. 4 and 5. Each of these jaws 34 is formed with a recess 35 adapted to engage under the cross bar 9 (Fig. 6), and these recesses 35 may in the present instance be substantially quarter round, the recesses merging into a half round recess 36 formed in the portion of the arm 12 disposed between the jaws 34, the wall of the half round recess 36 overlying said cross bar 9.

The arm 13 is formed with a similar pair of jaws 37, having recesses 38 corresponding to the recesses 35.

The operation may now be noted. Assuming that it is desired to fasten the hitch to the cross bar 9, the arms 12 and 13 in the fully contracted position thereof seen in Fig. 5, are slipped under the bumper 33 into a position in which the jaws of said arms overlie the cross bar. The free ends of said arms 12 and 13 are now dropped down upon the cross bar, and will permit the cross bar to be fully recessed in the recesses between the respective jaws of the arms. This is permitted because the jaws as previously noted are obliquely extended, and therefore when swung to their fully contracted positions seen in Fig. 5, the arms will provide wide recesses of a diameter sufficient to permit the arm 9 to slip into the space between the respective jaws 34 and 37. In other words, the recesses between the respective jaws 34 and 37 extend directly perpendicularly to the direction in which the jaws 34 or 37, as the case may be, extend. This causes a wide space to be defined between each pair of jaws to receive the cross bar 9.

When, however, the jaws have been swung downwardly upon the cross bar in this particular position, threading of the screw 30 to spread the arms 12 and 13 causes adjustment of the arms to a position as seen in Fig. 4 in which position the recesses now extend parallel to the axis of the cross bar 9, with the jaws underlying said cross bar as seen in Figs. 4 and 6. Collars 39 adjacent opposite ends of the cross bar engage the spread-apart arms 12 and 13 to limit spreading beyond a desired maximum distance.

The trailer or other towed structure or vehicle can now be secured to the ball 19, with any dolly or similar accessory equipment being engaged by the stud 21.

It will be understood that to separate the hitch from the towing vehicle, the reverse action is carried out, permitting complete separation of the hitch arms 12 and 13 from the cross bar, thus to permit normal use of the towing vehicle without visible evidence of a trailer hitched thereupon, and without the necessity of still pulling part of the towed structure such as a dolly.

Although it has been stated that the opposite ends of the screw 30 are adapted to receive a wrench, it will be understood that for speed in rotation of the screw, a crank means can be applied. Thus, an automobile lug wrench is well adapted to be slipped over the non-circular ends of the screw 30 for easy rotation thereof.

Important characteristics of the invention reside in its concealment of the hitch when a vehicle is not being towed; ease of installation and removal; and great strength, resulting from the spreading of the arms until the opposite end portions of the cross bar are fully and tightly bound by the jaws of the arms.

What is claimed is:

1. A trailer hitch comprising a cross bar adapted for fixed connection to a towing vehicle; a pair of arms pivotally joined at one end; and a pair of jaws proportioned for gripping of the cross bar and formed on the other end of each arm, the jaws of each pair extending obliquely relative to the longitudinal center line of the arm and projecting laterally from opposite sides of the arm, there being a recess formed in each arm between the jaws thereof, said recess being disposed perpendicularly to the direction in which the jaws are extended, for gripping the cross bar in the spread position only of the arms.

2. A trailer hitch comprising a pair of arms pivotally joined at one end; means at said end for connecting to the arms a towed vehicle; means for drawing together and spreading said arms; a cross bar adapted for fixed connection to a vehicle frame below the body of the vehicle; and a pair of jaws on each arm at the free end thereof, the jaws of each pair extending obliquely relative to the longitudinal center line of the arm on which said jaws are formed, said jaws being obliquely extended from opposite sides of each arm, the jaws opposing each other and being formed as claw-like projections adapted to engage under said cross bar in the spread position only of the arms.

3. A trailer hitch comprising a cross bar adapted for fixed connection to a towing vehicle; a pair of arms, means connecting said arms for movement in an arcuate path about a common axis, said arms having recesses extending therethrough remote from the common axis for receiving the cross bar, said recesses lying perpendicular to the arcuate path, jaw members carried by the arms adjacent the recesses for partially embracing the cross bar when the arms are spread, and means carried by and extending between the arms for moving said arms about the common axis and thereby moving said jaw members into and out of rod embracing position.

JOHN C. BENDER.

REFERENCES CITED

The following references are of record in the file of this patent:

UNITED STATES PATENTS

| Number | Name | Date |
| --- | --- | --- |
| 1,355,640 | Butler | Oct. 12, 1920 |
| 1,435,063 | Holmes | Nov. 7, 1922 |
| 2,073,566 | Scheubner | Mar. 9, 1937 |

FOREIGN PATENTS

| Number | Country | Date |
| --- | --- | --- |
| 149,534 | Great Britain | Aug. 19, 1920 |
| 487,825 | Germany | Dec. 14, 1929 |